United States Patent [19]

Borgmann et al.

[11] Patent Number: 4,744,522
[45] Date of Patent: May 17, 1988

[54] FOOD PROCESSOR WITH JUICE EXTRACTOR

[75] Inventors: Michael Borgmann; Egon Kunde; Stefan Henn, all of Solingen, Fed. Rep. of Germany

[73] Assignee: Robert Krups Stiftung & Co. KG., Solingen, Fed. Rep. of Germany

[21] Appl. No.: 943,677

[22] Filed: Dec. 18, 1986

[30] Foreign Application Priority Data

Dec. 20, 1985 [DE] Fed. Rep. of Germany ....... 3545227
Dec. 20, 1985 [DE] Fed. Rep. of Germany ....... 3545226

[51] Int. Cl.⁴ .................. A23N 1/00; A02C 18/12
[52] U.S. Cl. ........................ 241/92; 99/503; 99/505; 241/101.1; 241/101.2
[58] Field of Search ............ 99/501, 505, 503; 241/92, 101.1, 101.2, 282.1, 282.2

[56] References Cited

U.S. PATENT DOCUMENTS

| | | | |
|---|---|---|---|
| 2,552,572 | 5/1951 | Mikina | 99/503 |
| 4,080,885 | 3/1978 | Pauty | 99/501 |
| 4,127,342 | 11/1978 | Coggiola | |
| 4,240,338 | 12/1980 | McClean | 99/501 |
| 4,378,730 | 4/1983 | Coggiola | 99/501 |

FOREIGN PATENT DOCUMENTS 2041727 9/1980 United Kingdom ............ 99/501

*Primary Examiner*—Mark Rosenbaum
*Attorney, Agent, or Firm*—Peter K. Kontler

[57] ABSTRACT

A food processor wherein the output member of the prime mover extends vertically upwardly into a removable bowl and drives a rotary torque transmitting member having at its upper end a set of teeth arranged to mate with the teeth of a gear provided in a rotary juice extractor which is installed in a receptacle on top of the bowl. The torque transmitting member is a single-purpose part or it can constitute an adapter with additional external teeth arranged to drive a tool at a level below a cover which replaces the receptacle or a tool at a level directly or closely above the bottom portion of the bowl. The receptacle has a perforated bottom wall which permits juice to descend into the bowl, and the juice extractor rotates in the receptacle about an axis which is parallel to and remote from the axis of the torque transmitting member. Alternatively, the axis of rotation of the torque transmitting member coincides with the axis of rotation of the juice extractor; the rotary member then drives the juice extractor by way of a transmission, such as a planetary transmission.

24 Claims, 7 Drawing Sheets

FOOD PROCESSOR WITH JUICE EXTRACTOR

BACKGROUND OF THE INVENTION

The present invention relates to food processors in general, and more particularly to improvements in food processors of the type wherein any one of several tools can be mounted in a removable bowl to be driven by a prime mover (normally comprising an electric motor) in order to treat one or more foodstuffs. The tools which are used in such food processors include slicing, cutting, dicing, whipping, agitating and/or other tools adapted to receive torque from a prime mover by way of an adapter (which can accept any one of several tools as disclosed in the commonly owned copending patent applications Ser. Nos. 926,864 (continuation of Ser. No. 708,352, now abandoned) 001,253 (continuation-in-part of Ser. No. 926,864) and 645,439, now U.S. Pat. No. 4,669,672 or each of which has its own hub with coupling means for attachment to the output member of the prime mover (as disclosed, for example, in U.S. Pat. No. 4,127,342).

A drawback of presently known food processors is that they lack sufficient versatility. Thus, even though such conventional food processors can accept and can operate with any one of a number of different tools or implements, they are not capable of accepting and operating with certain other tools or implements which are often used in a culinary establishment on a daily basis or even several times a day so that the utilization of such other tools or implements necessitates the purchase of a discrete apparatus with its own prime mover, collecting bowl, controls for the prime mover and others.

OBJECTS AND SUMMARY OF THE INVENTION

An object of the invention is to provide a food processor which is designed in such a way that, though its basic construction need not appreciably depart from that of a known food processor, it is nevertheless capable of performing operations which cannot be carried out with heretofore known food processors.

Another object of the invention is to provide a food processor which can be used to extract or squeeze out juices from citrus fruits or the like and which can be converted for such operation in a simple and time-saving manner.

A further object of the invention is to provide a juice extractor which can be used in conjunction with the above outlined food processor.

An additional object of the invention is to provide the food processor with novel and improved means which renders it possible to operate a juice extractor by transmitting thereto motion from an output member which is driven by an electric motor or another motor at a speed much higher than acceptable for juice extractors (e.g., by a motor whose output shaft is driven at 1400 RPM or even at a higher speed).

Still another object of the invention is to provide a novel and improved adapter which can be used in a food processor of the above outlined character.

An additional object of the invention is to provide a food processor which can gather fruit juices in the customary bowl so that there is no need for the provision of a specially designed vessel for collection of juices.

Another object of the invention is to provide a novel and improved method of converting a standard food processor for extraction of juices from oranges, limes, lemons, grapefruits and the like.

A further object of the invention is to provide a novel and improved sieve for gathering seeds which are expelled from oranges and like fruits during extraction of juices.

Another object of the invention is to provide a food processor for use with a juice extractor which is constructed and assembled in such a way that all of its parts can be readily reached for cleaning, inspection and/or repair and wherein the motion transmitting parts are lightweight, simple and inexpensive components each of which can be mass-produced in existing machinery.

An additional object of the invention is to provide a combination of a torque transmitting device, a receptacle and a juice extractor which can be used with a commercially available basic food processor.

The invention is embodied in a food processor which comprises a housing, a prime mover which is installed in the housing and has an upright rotary output member, a bowl which is removably mounted on the housing and has an open top and a bottom portion with an opening (e.g., the passage in an upwardly extending tubular extension of the bottom portion) for the output member, a receptacle (e.g., a second bowl) which is removably mounted on and has an apertured (e.g., slotted) bottom wall overlying the top of the bowl, a rotary juice extractor which is mounted in the receptacle, and means for transmitting torque from the output member to the juice extractor.

The torque transmitting means can comprise a single-purpose rotary member which is driven by the output member of the prime mover and has a first set of teeth. The juice extractor of such apparatus has a second set of teeth which mate with the teeth of the first set. For example, the juice extractor can be provided with an integral or separable internal gear which includes the second set of teeth. The rotary member can be made from a single piece of plastic material and the output member of the prime mover can comprise an electrical insulator having a first coupling element in mesh with a second coupling element of the rotary member. The latter can comprise a tubular first portion which directly surrounds the insulator and a second portion which extends upwardly through the bottom wall of the receptacle and transmits torque to the juice extractor.

The top portion of the rotary member is preferably adjacent to the first set of teeth and can extend into an annular space of the juice extractor to ensure that the rotary member cannot wobble and also that the juice extractor cannot wobble when the prime mover is operative to drive the juice extractor by way of the rotary member. The juice extractor can comprise concentric annular inner and outer walls which are respectively surrounded by and surround the annular space.

The bottom wall of the receptacle is preferably further provided with a substantially centrally located socket and the juice extractor is then provided with a centrally located downwardly extending projection or shank which extends into the socket and defines with the socket a vertical axis about which the juice extractor rotates. Such axis is parallel to the common axis of the rotary member and the output member. The deepmost portion of the socket is preferably bounded by a flat surface and the projection of the juice extractor can be provided with a rounded tip which is or can be in a mere point contact with the flat surface to thus reduce friction between the receptacle and the juice extractor.

The latter can constitute a hollow conical body made of a suitable plastic material.

In accordance with another embodiment of the invention, the rotary torque transmitting member can constitute a multiple-purpose adapter which has a first coupling element receiving torque from the output member, a second coupling element which can rotate the juice extractor (such second coupling element can comprise a set of external teeth corresponding to the teeth of the aforementioned single-purpose rotary member), and at least one additional (third) coupling element which is disposed in the bowl and serves to drive a rotary tool (e.g., a rotary shredding, comminuting, agitating, whipping, slicing or other tool). The additional coupling element can be located adjacent the bottom portion of the bowl or adjacent the underside of the receptacle. Furthermore, the adapter can comprise a first additional coupling element adjacent the open top of the bowl and a second additional coupling element adjacent the bottom portion of the bowl. At least one of the additional coupling elements can have teeth which are parallel with or inclined relative to the axis of the adapter. The same applies for the teeth which drive the juice extractor and for the teeth of the coupling element which is driven by the output member.

The adapter can be made of a single piece of plastic material and can include a hollow portion which surrounds the output member in the bowl and a second portion which is coaxial with the hollow portion and carries the second coupling element.

The adapter or the single-purpose rotary member can be provided with a tubular skirt which surrounds the aforementioned upwardly projecting extension of the bottom portion of the bowl. Alternatively, the extension can surround the lower portion of the torque transmitting means (either adapter or rotary member).

Locking means can be provided for releasably securing the receptacle to the bowl. Furthermore, the food processor can be provided with means for blocking the operation of the prime mover in response to detachment of the receptacle from the bowl and/or in response to detachment of the bowl from the housing or when the bowl and/or receptacle is not properly mounted in the food processor.

The receptacle and the juice extractor are or can be replaced with a cover when the juice extractor is not in use. Such cover can be provided with a socket for the topmost portion of the torque transmitting means to reduce the likelihood of wobbling or other stray movements when the torque transmitting means drives a shredding, cutting, mixing, whipping, kneading and/or other tool.

In accordance with a further embodiment of the invention, the torque transmitting means between the juice extractor and the output member of the prime mover comprises a rotary member (e.g., the aforementioned single-purpose member or an adapter) which is driven by the output member and a transmission (e.g., a planetary transmission) between the rotary member and the juice extractor. The transmission is preferably arranged to rotate the juice extractor at a fraction of the RPM of the output member to e.g., at 20 percent or less of the RPM of the output member). If the transmission is a planetary transmission, it can comprise a sun gear (which can be integral with or separably mounted on the rotary member), a casing which is non-rotatably connected with the receptacle and has an internal gear, a planet pinion (or two or more planet pinions) mating with the internal gear as well as with the sun gear, and a planet carrier which rotatably supports the planet pinion(s) and is non-rotatably connected with the juice extractor.

The bottom wall of the receptacle can be provided with a substantially centrally located opening having a non-circular outline and the casing then comprises a portion which extends into and is non-rotatably received in the opening of the bottom wall.

The juice extractor can be provided with a shank having an axially extending hole or bore of non-circular outline, and the planet carrier can comprise a non-circular portion which extends into the hole and serves to rotate the juice extractor in response to rotation of the planet pinion(s) by the sun gear on the rotary member.

The novel features which are considered as characteristic of the invention are set forth in particular in the appended claims. The improved food processor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
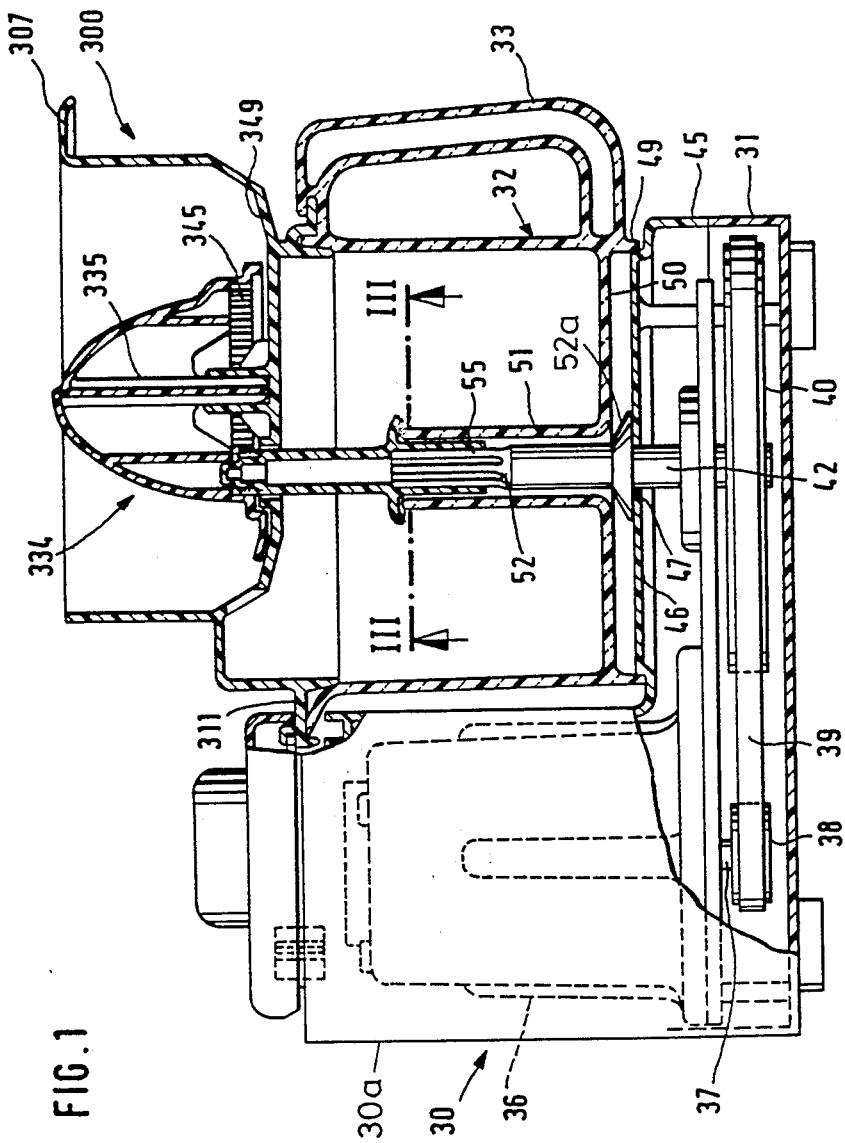
FIG. 1 is a somewhat schematic partly elevational and partly vertical sectional view of a food processor wherein the torque transmitting member is designed to drive only one type of torque receiving means, namely a juice extractor which is mounted in a receptacle on top of the bowl.
Figure 2:
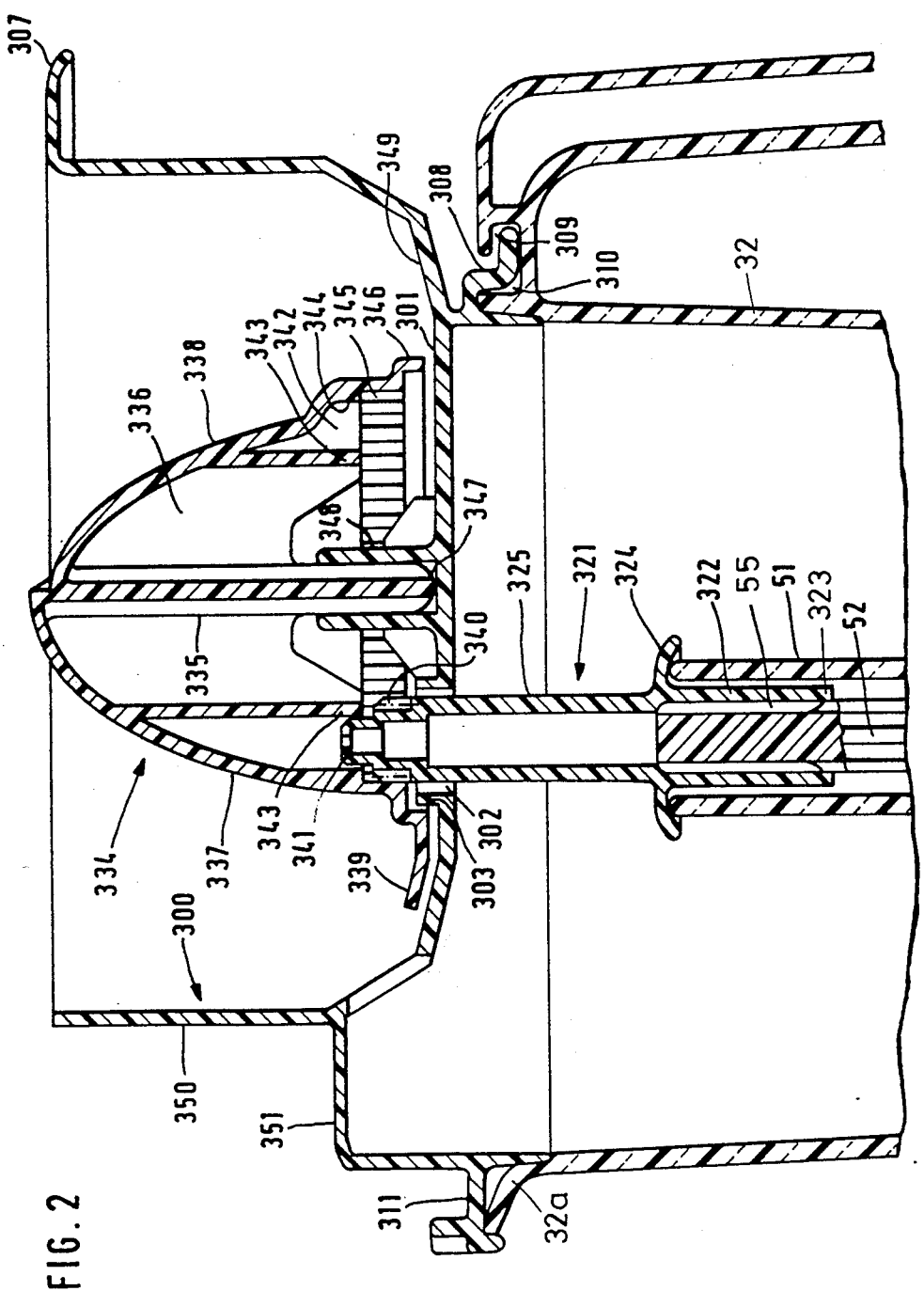
FIG. 2 is an enlarged sectional view of a detailed in the food processor of FIG. 1.
Figure 3:
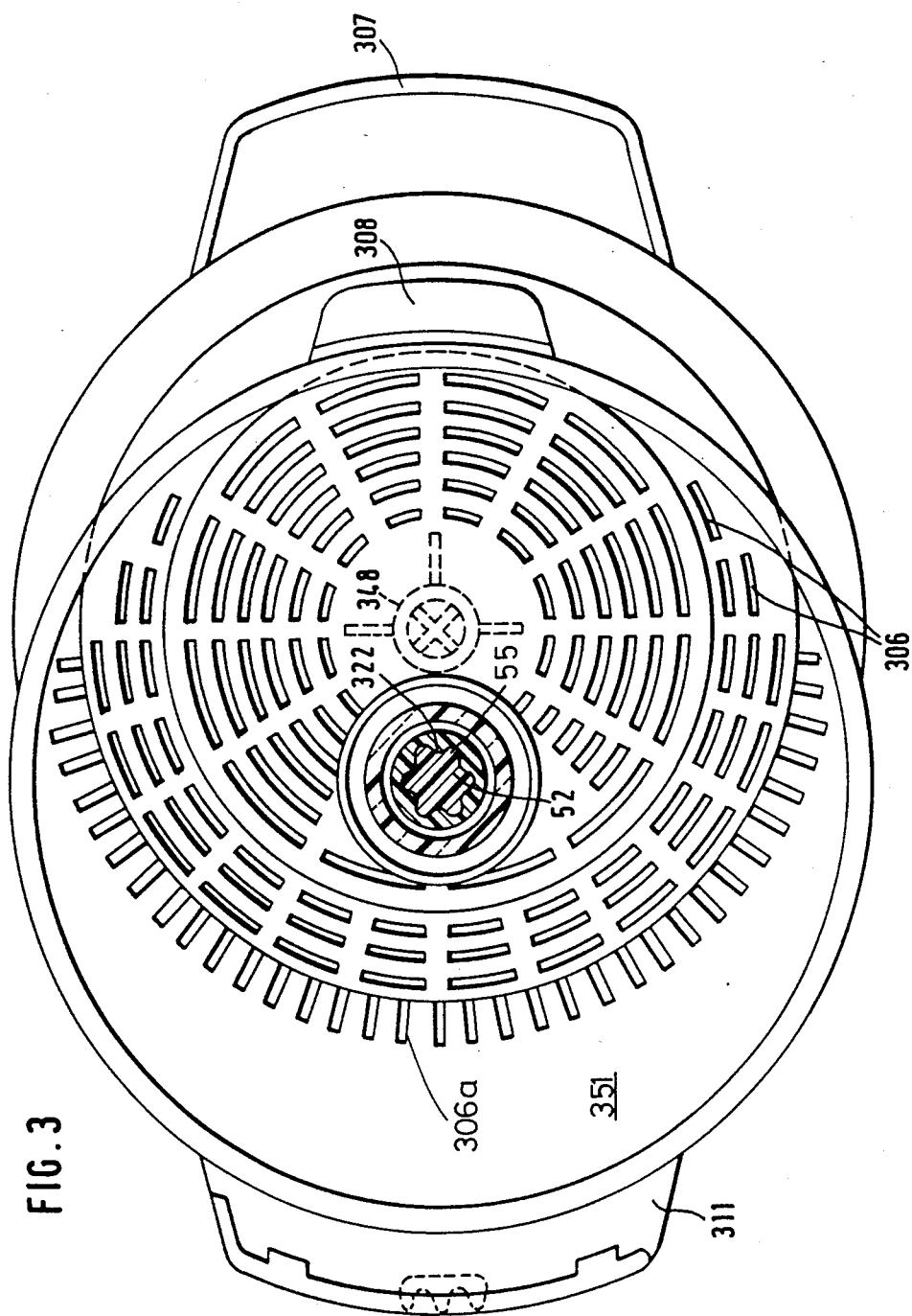
FIG. 3 is an enlarged horizontal sectional view as seen in the direction of arrows from the line III—III of FIG. 1.

Referring first to FIGS. 1 to 3, there is shown a food processor which comprises an L-shaped housing 30 including an upright portion 30a which confines the electric motor 36 of a prime mover. The prime mover further comprises a relatively small toothed pulley 38 which is driven by the motor shaft 37, a relatively large toothed pulley 40 which is driven by the pulley 38 through the medium of an internally toothed endless belt 39 and simultaneously performs the function of a fan, and an upwardly extending composite output member including a shaft 42 driven by the pulley 40 and a sleeve-like electrical insulator 52 which is slipped onto (or is integrally connected with) and is driven by the shaft 42. The belt 39 and the pulleys 38, 40 of the prime mover are disposed in the relatively flat lower portion 31 of the housing 30. The portion 31 is hollow and has a removable upper section 45 including a horizontal top wall 46 provided with an opening 47 for the output member including the shaft 42 and the insulator 52. The opening 47 is preferably surrounded by a smooth surface of the top wall 46 and is overlapped by a collar 52a provided on the insulator 52 and serving to propel any liquids that enter the space above the top wall 46 radially outwardly and away from the opening 47.

The means for supplying electrical energy for the motor 36 and certain other conventional details of the food processor are not shown in the drawing because they are not germane to the present invention. The circuit of the motor 36 can comprise means for rotating the composite output member 42, 52 at several speeds.

The portion 31 of the housing 30 supports a removable bowl 32 having an open top and a bottom portion 50 which is adjacent but spaced apart from the top wall 46 of the section 45. The central part of the bottom portion 50 has a relatively long upwardly extending tubular portion or extension 51 which surrounds the insulator 52. The purpose of the extension 51 is to reduce the likelihood of penetration of liquids and/or comminuted solid food particles into the space between the bottom portion 50 and the top wall 46. The bowl 32 is further provided with a handle 33 and has several spaced apart legs 49 which surround a circular platform forming part of the top wall 46 and serving to prevent any lateral shifting of the bowl 32 relative to the housing portion 31 when the bowl is properly placed onto the portion 31. The legs 49 define a set of circumferentially extending clearances which allow liquid and/or solid matter (if any) to escape from the space between the bottom portion 50 and the top wall 46. The bowl 32 is or can be made of a light-transmitting material so that the person in charge can observe the treatment of one or more foodstuffs in the interior of the bowl when the motor 36 is in operation to rotate the output member 42, 52.

Figure 4:
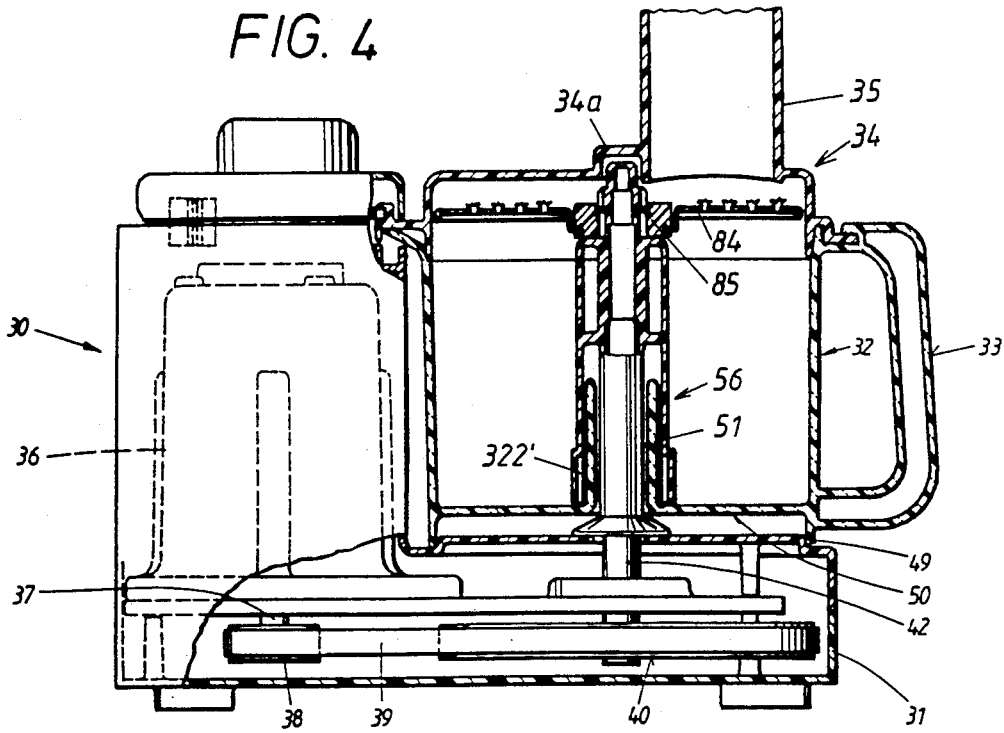
FIG. 4 is a somewhat schematic partly elevational and partly vertical sectional view of the food processor of FIG. 1 wherein the single-purpose torque transmitting member is replaced with a torque transmitting member in the form of an adapter which can drive a variety of tools close to the bottom portion of the bowl and/or close to the underside of a cover which replaces the receptacle and the juice extractor of FIGS. 1-3.
Figure 9:
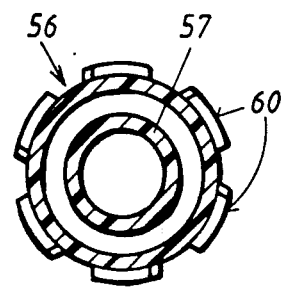
FIG. 9 is a transverse sectional view of the adapter as seen in the direction of arrows from the line IX—IX of FIG. 6.

When the bowl 32 receives a supply of material which is to be comminuted, its open top is normally overlapped by a cover 34 shown in FIG. 4 and also in FIG. 9 of the commonly owned U.S. Pat. No. 4,669,672. The disclosure of U.S. Pat. No. 4,669,672 is incorporated herein by reference.

FIG. 1 further shows a receptacle 300 which can be placed on top of the bowl 32 in lieu of the cover 34. The receptacle 300 can also consist of a light-transmitting material and contains a substantially conical removable hollow juice extractor 334.

Figure 10:
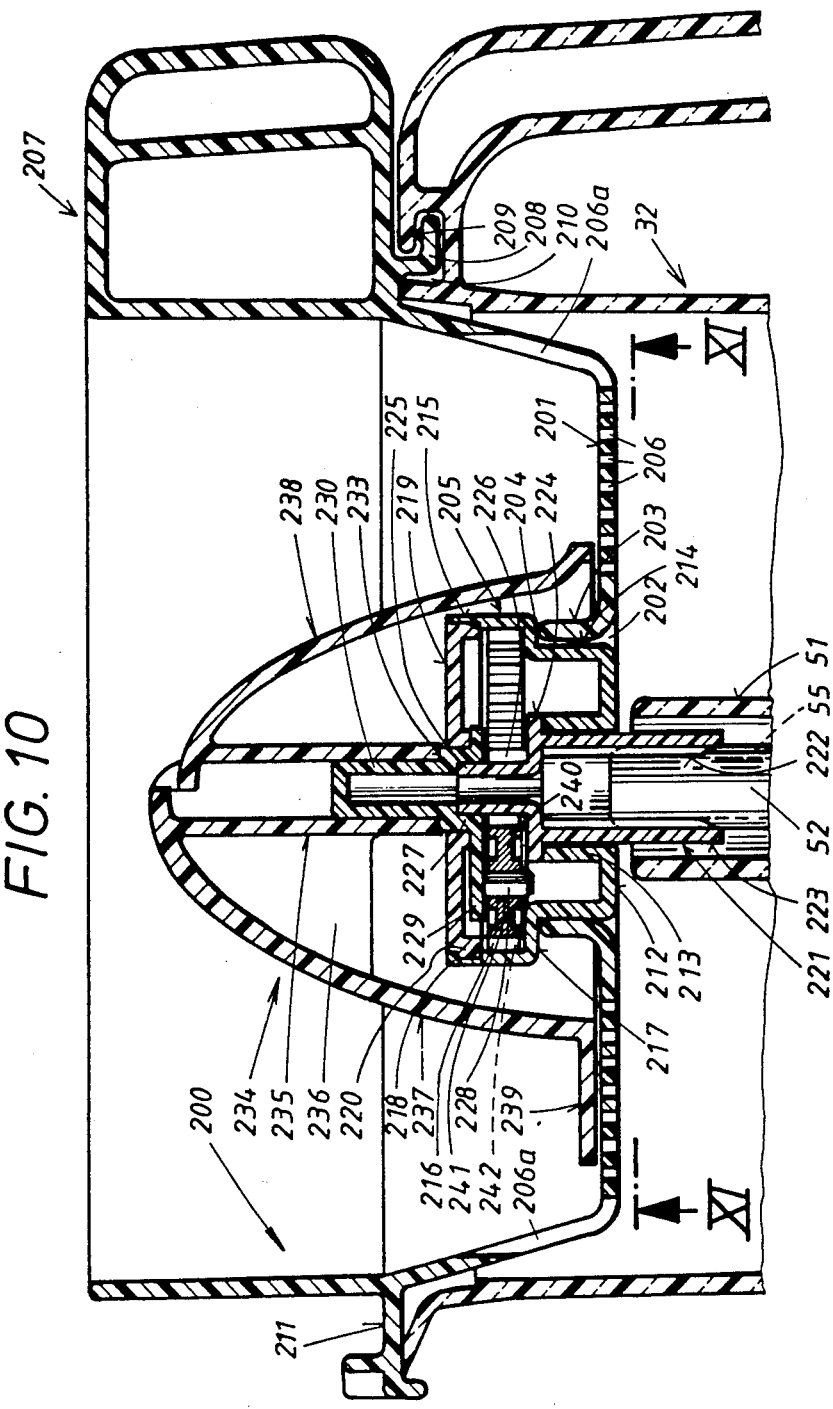
FIG. 10 is a fragmentary vertical sectional view of a food processor wherein the torque receiving means of FIG. 1 drives a juice extractor by way of a planetary transmission.

The manner in which the two sections of the housing portion 31 are separably held together and the exact design of the combined pulley and fan 40 form no part of the present invention. Reference may be had to FIG. 10 of U.S. Pat. No. 4,669,672. The housing 30 can be placed onto a table, a counter or any other suitable support in a kitchen or the like. The shaft 42 can comprise several portions having different diameters and at least some of these portions can be knurled or serrated as shown in FIG. 10 of U.S. Pat. No. 4,669,672 to ensure that the shaft 42 and the insulator 52 will rotate as a unit. The insulator 52 is preferably a one-piece sleeve of suitable plastic material and its upper end is closed to prevent foreign matter from contacting the shaft 42 in the interior of the bowl 32. The collar 52a which overlies the opening 47 in the top wall 46 is or can be an integral part of the insulator 52.

The external surface of the insulator 52 has a coupling element 55 which has an undulate shape (see FIG. 3) and serves to transmit torque to the complementary internal coupling element 322 of a hollow tubular rotary torque transmitting member 321 which is removably mounted on the insulator 52 in a manner best shown in FIG. 2. The larger-diameter tubular lower portion 323 of the rotary member 321 fits into the extension 51 of the bottom portion 50 and its upper end is provided with a circular collar 324 which overlies the open top of the extension 51 so as to reduce the likelihood of penetration of pieces of foodstuffs and/or liquids into the extension and thence into the space between the bottom portion 50 and the top wall 46.

The receptacle 300 is applied in lieu of the cover 34 when the food processor of the present invention is used to extract juice from oranges, limes, lemons, grapefruits and like fruits. The bottom wall 301 of the receptacle 300 has an array of openings in the form of circumferentially extending arcuate slots 306 and radially extending slots 306a. The length of slots 306 in successive annuli of slots increases in proportion to their spacing from the center of the receptacle 300. The length of all slots 306a is or can be the same, and these slots are outwardly adjacent the outermost annulus of arcuate slots 306. The slots 306, 306a are provided in that portion of the bottom wall 301 which overlies the open top of the bowl 32. The bottom wall 301 can be said to constitute a coarse sieve which allows extracted juice to descend into the bowl 32 when the juice extractor 334 in the receptacle 300 is in actual use. The portion 349 of the bottom wall 301 is devoid of slots or any other openings because it does not overlie the open top of the bowl 32.

The rotary torque transmitting member 321 has an external coupling element 340 in the form of an annulus of axially parallel or inclined teeth which mate with the teeth 345 of the juice extractor 334. The latter is a hollow body whose base has an internal gear including the teeth 345. It will be noted that the axis of the internal gear including the teeth 345 is parallel to and spaced apart from the common vertical or nearly vertical axis of the shaft 42, insulator 52 and rotary member 321. The bottom wall 301 of the receptacle 300 has a preferably oval opening 302 through which the tubular upper portion 325 of the rotary member 321 extends so that the teeth 340 can mate with the adjacent teeth 345. The opening 302 is surrounded by a tubular bearing member 303 for the juice extractor 334. In the embodiment of FIGS. 1 to 3, the rotary member 321 consists of a single piece of suitable plastic material and its tubular lower portion 323 is provided with the aforementioned internal coupling element 322 which is in mesh with the external coupling element 55 of the insulator 52 so that the member 321 is compelled to share all angular movements of the output member 42, 52 as soon as the coupling element 322 is brought into mesh with the coupling element 55. The member 321 is readily detachable to facilitate cleaning as well as to allow for replacement of the receptacle 300 with a cover 34.

The uppermost portion or tip 341 of the rotary member 321 is immediately or closely adjacent the coupling element 340 and is received in an annular space 342 between concentric annular inner and outer walls 344, 343 of the juice extractor 334 so as to ensure that the extractor is properly guided when the motor 36 is started to rotate the member 321.

The internal gear including the teeth 345 is an integral part of the juice extractor 334. However, it is equally within the purview of the invention to use a separately produced internal gear which is permanently or detachably mounted in the base 346 of the juice extractor.

The receptacle 300 is preferably a one-piece body made from a suitable plastic material and is sufficiently large to collect juice from a reasonably large number of citrus fruits. Its rim is provided with a handle 307 which is preferably disposed at a level above and in register with the handle 33 of the bowl 32 when the receptacle 300 is properly mounted on top of the bowl. The lower part of the receptacle 300 has a substantially hook-shaped locking portion 308 which is received in a complementary L-shaped recess 310 of the bowl 32 in the region of the upper end of the handle 33. A stop 309 serves as an abutment for the locking member 308 when the latter is fully received in the recess 310 as well as to prevent further angular movement of the receptacle 300 in one direction, namely in a direction in which the receptacles would tend to rotate when the member 321 is driven to rotate the juice extractor 334. The locking member 308 can be provided with a specially designed extension or facet which abuts the stop 309 when the handle 307 is disposed above and registers with the handle 33.

That portion of the receptacle 300 which is disposed diametrically opposite the handle 307 has a relatively flat arcuate projection 311 which forms part of a safety device and is receivable in that portion (30a) of the housing 30 which confines the motor 36 so as to enable the motor 36 to rotate the output member 42, 52. The arrangement is such that the motor 36 can be started only when the projection 311 is properly received in the housing 30 above the motor 36. Reference may be had to FIGS. 17-18 of the commonly owned copending patent application Ser. No. 926,864 (continuation of Ser. No. 708,352, filed Mar. 5, 1985 and now abandoned) which shows a safety device suitable for use in the food processor of the present invention. The safety device allows for completion of the motor circuit only when the receptacle 300 is properly mounted on and is properly oriented relative to the bowl 32 and housing 30. The purpose of the safety device is to reduce the likelihood of injury to the operator.

FIG. 2 shows that the upper portion or section 350 of the receptacle 300 constitutes or resembles an upright cylinder. The lower portion or section of the receptacle 300 has a laterally extending part 351 which is disposed opposite the handle 307 and has a horizontal top wall having a substantially crescent-shaped outline (FIG. 3). The aforementioned projection 311 is disposed centrally of and extends outwardly from the part 351.

The internal space 336 of the juice extractor 334 accommodates a centrally located projection or shank 335 which has a substantially cruciform cross-sectional outline (see FIG. 3) and a rounded lower end portion 347 abutting a flat surface at the bottom of a centrally located bearing or socket 348 forming an integral part of the bottom wall 301 of the receptacle 300. The provision of longitudinally extending external ribs on the projection 335, together with the convexity of its lower end portion 347 and the flat surface at the bottom of the socket 348, contributes to a reduction of friction between the juice extractor 334 and the socket 348.

the base 346 of the juice extractor 334 extends downwardly beyond the teeth 345 and has a laterally extending lip 339 which can be grasped by hand to facilitate insertion of the juice extractor 334 into or its removal from the interior of the receptacle 300. The lip 339 can further perform a comminuting or secondary squeezing or extracting action by engaging and squashing pieces of fruit meat on the bottom wall 301 of the receptacle 300 when the extractor 334 is rotated by the member 321. This produces additional juice which flows through the slots 306, 306a and into the bowl 32.

The juice extractor 334 has an external surface whose configuration is best suited to ensure rapid extraction of juice from a halved citrus fruit which is placed onto the tip of the juice extractor and is pushed downwardly toward the bottom wall 301. The extracting action is enhanced if the external surface of the juice extractor 334 has an undulate outline wherein ridges or hills 337 alternate with recesses or valleys 338. The transition from the hills into the valleys and vice versa is gradual. FIG. 2 merely shows a single hill 337 at the left-hand side and a single valley 338 at the right-hand side of the projection 335.

When the food processor of FIGS. 1 to 3 is in use, the receptacle 300 is mounted on top of the bowl 32 and the locking portion 308 abuts the stop 309 so that the receptacle is held in a predetermined angular position. The projection 311 (together with the adjacent portion 32a of the bowl 32) extends into the portion 30a of the housing 30 at a level above the motor 36 so that the bowl and the receptacle are held against rotation relative to the housing portion 31. The legs 49 hold the bowl 32 against any or against appreciable lateral movement relative to the portion 31. The number of teeth 340 is a small fraction of the number of teeth 345 (e.g., the rotary member 321 can have thirteen teeth 340 and the base 346 of the juice extractor 334 can have seventy three teeth 345) so that the rotational speed of the juice extractor about the common axis of the projection 335 and socket 348 is relatively low, even if the member 321 is driven at a rather high speed. The user can maintain in readiness a selected number of half oranges, grapefruits, limes or lemons and proceeds with the extraction of juice by pressing the fruit halves (with the exposed surface of the meat facing down) against the hills 337 and valleys 338 of the rotating juice extractor 334. The juice flows toward the bottom wall 301 and passes through the slots 306, 306a into the bowl 32. The latter can be provided with a suitable spout (the part 32a can constitute a simple spout) which allows for convenient pouring of juice upon lifting of the receptacle 300 and extractor 334 off the top of the bowl 32. Seeds and larger pieces of fruit are intercepted by the bottom wall 301 of the receptacle 300. The dimensions of the slots 306, 306a are selected with a view to determine in advance the dimensions of those portions of fruit which are permitted to descend into the bowl 32.

The food processor of FIGS. 1 to 3 can be modified in a number of ways without departing from the spirit of the invention. For example, the dimensions, shape and/or material of the rotary member 321 can be altered as long as the member 321 can drive the juice extractor 334 in response to rotation of the output member 42, 52. The number of teeth 340 and/or 345 can be varied within a wide range, and the same holds true for the shape and orientation of these teeth. The shape of walls 343, 344 (which define the annular space 342 for the tip 341 of the rotary member 321) can also depart from the illustrated shape, and the receptacle 300 can be replaced with a larger, smaller and/or differently configured receptacle. The locking means including the portion 308, stop 309 and recess 310 can be replaced with different locking means, and this also applies for the safety device including the projection 311. The distribution and/or shape of openings in the bottom wall 301 of the receptacle can depart from those shown in FIG. 3.

An important advantage of the rotary torque transmitting member 321 is its simplicity. This is due to the fact that the member 321 merely comprises an internal coupling element 322 for reception of torque from the external coupling element 55 of the insulator 52 and an external coupling element (teeth 340) for transmission of torque to the juice extractor 334. The member 321 is relatively short, i.e., it need not extend all the way to the bottom portion 50 of the bowl 32.

FIG. 4 shows a food processor which is practically identical with the food processor of FIGS. 1 to 3 except that the rotary torque transmitting member 321 is replaced with a different rotary member 56 constituting an adapter designed to rotate one or more parts (particularly tools) in addition to the juice extractor 334. The details of the rotary member or adapter 56 are shown (drawn to a larger scale) in FIGS. 6, 7, 8 and 9.

Figure 5:
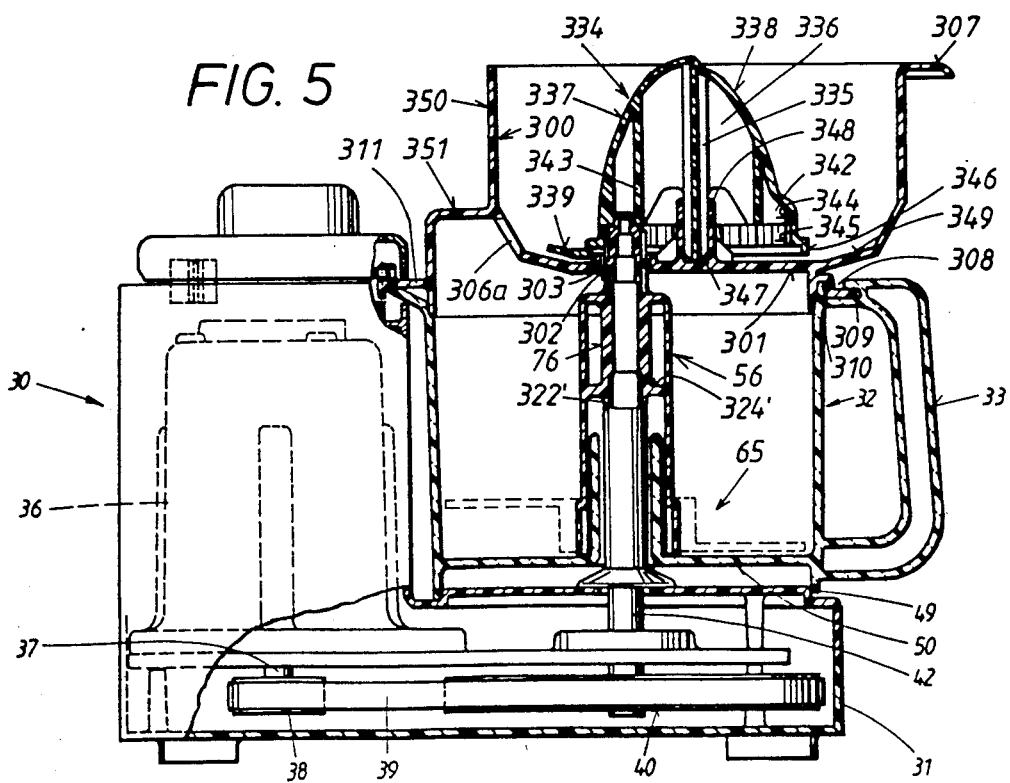
FIG. 5 illustrates the structure of FIG. 4 wherein the cover is replaced with the receptacle and juice extractor of FIG. 1.
Figure 6:
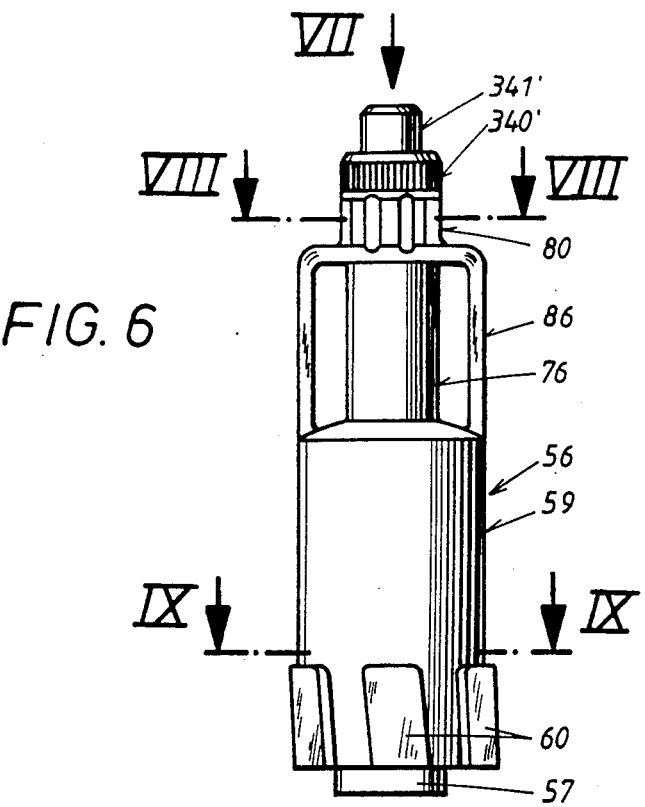
FIG. 6 is an enlarged elevational view of the adapter.
Figure 7:
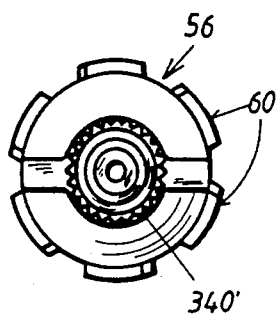
FIG. 7 is a plan view of the adapter as seen in the direction of arrow VII in FIG. 6.
Figure 8:
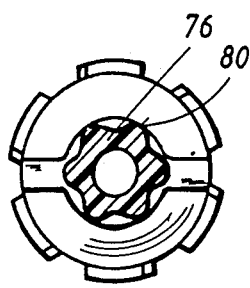
FIG. 8 is a transverse sectional view of the adapter as seen in the direction of arrows from the line VIII—VIII of FIG. 6.

Referring to FIGS. 6-9, the adapter 56 is an elongated one-piece body of plastic material which is basically a tube having several portions or sections with different outer diameters. The lowermost portion 59 is a tubular skirt which surrounds the extension 51 of the bowl 32 when the adapter 56 is mounted in the bowl in a manner as shown in FIGS. 4 and 5. The lower end of the skirt 59 is provided with an external coupling element 60 including an annulus of teeth which are inclined with reference to the axis of the adapter and alternate with tooth spaces for reception of complementary internal teeth on a rotary comminuting, foaming, agitating or other tool 65 of the type indicated by phantom lines in the bowl 32 of FIG. 5. The tool 65 is adjacent the bottom portion 50 of the bowl 32 when this tool is properly mounted on the skirt 59 and the adapter 56 is properly mounted on the extension 51.

The adapter 56 further comprises an inner tubular portion 57 which is spacedly surrounded by the skirt 59 and is received in the extension 51 so as to surround the insulator 52. The inner tubular portion 57 has an internal coupling element 322' which mates with the external coupling element 55 of the insulator 52 to ensure that the adapter 56 rotates with the output member 42, 52 when the motor 36 is on. A radial partition 324' between the tubular portion 57 and the skirt 59 reinforces the adapter 56.

The upper part 76 of the inner tubular portion 57 has an annulus of teeth 340' serving to drive the juice extractor 334 (see FIG. 5), and a further external coupling element 80 which serves to rotate a tool (e.g., a grating tool 84 shown in FIG. 4) when the receptacle 300 is replaced with the cover 34. The cover 34 has a tube 35 for admission of foodstuffs which are severed (e.g., sliced) by the rotating tool 84. The internal coupling element of the tool 84 (not specifically shown) is complementary to the external coupling element 80 of the adapter 56. Such internal coupling element is provided in a boss 85 forming an integral or separable part of the tool 84 and being slipped onto the adapter 56 when the food processor is to be used to comminute material which is admitted by way of the tube 35. The projection or tip 341' of the adapter 56 is received in a complementary socket 34a of the cover 34 so that the adapter is reliably held against lateral stray movements when the cover 34 is applied over the open top of the bowl 32 in lieu of the aforedescribed receptacle 300. It is clear that the tool 84 can be replaced with any one of a variety of different tools, and the same applies for the tool 65. The latter can be replaced with a whipping tool for eggs, mayonnaise and the like. A suitable agitator is disclosed in U.S. Pat. No. 4,669,672.

The adapter 56 is further provided with a set of substantially L-shaped wings 86 which surround the part 76 of the tubular portion 57 above the skirt 59. These wings can be used as a means for facilitating insertion of the adapter 56 into or its extraction from the bowl 32. For example, the adapter 56 can be provided with four equidistant wings 86. These wings can perform the additional function of propelling particles of food, which descend from the tool 84, toward the internal surface of the cylindrical wall of the bowl 32.

The adapter 56 can be modified in a number of ways. For example, the number of teeth forming the external coupling element 60 can be increased or reduced, such teeth can be parallel to the axis of the adapter, and they need not necessarily extend all the way to the lower end of the skirt 59. The skirt 59 and/or tubular portion 57 need not extend all the way to the bottom portion 50 of the bowl 32, and the number and/or configuration of teeth or ribs forming the coupling element 80 and/or 340' can also depart from the illustrated number and/or configuration. This also holds true for the coupling element 322' which transmits torque from the coupling element 55 to the tubular portion 57 of the adapter 56.

An additional advantage of the adapter 56 is its versatility. Thus, the adapter can transmit torque to the juice extractor 344, to any one of a variety of tools whose internal coupling elements can be engaged with the external coupling element 80, or to any one of a variety of tools whose external coupling elements can receive torque from the external coupling element 60. Still further, the external coupling element 340' or 80 can be omitted if the other of these coupling elements is designed to drive a tool (such as 84) close to the underside of the cover 34 or a juice extractor 334. All that is necessary is to lengthen the teeth of the coupling element 80 or 340' so as to ensure that such single set of teeth can engage with the internal teeth 345 of the juice extractor 334 or with the internal teeth of the tool 84 or a similar tool.

It is further clear that the adapter 56 can be provided with one or more additional external coupling elements (not shown) between the coupling elements 60 and 80 if the material in the bowl 32 is to be treated by a tool which must be located at a certain level above and spaced apart from the bottom portion 50 as well as at a certain level below the spaced apart from the cover 34.

The rotary member 321 and the adapter 56 exhibit the advantage that the coupling elements 322, 340 are, or can constitute, integral parts of the rotary member 321 and the coupling elements 322', 60, 80 and 340' constitute (or can constitute) integral parts of the adapter 56. This contributes significantly to simplicity and lower cost of the entire food processor because the rotary members 321, 56 can be mass-produced in available machines at a low cost.

The placing of the coupling element 340 or 340' close to or in immediate proximity of the respective tip 341 or 341' ensures that the coupling element 340 or 340' remains in proper mesh with the coupling element 345 because the upper end portion of the rotary member 321 or 56 is guided close to the location of transmission of torque to the juice extractor 334. The provision of guide means (walls 343, 344) for the tip 341 or 341' adds little, if anything, to the cost of the juice extractor 334 because these guide means are formed simultaneously with all other parts of the juice extractor in a mass-producing machine. Thus, there is no need for installation of guide means 343, 344 in a secondary operation following the making of the juice extractor.

The oval shape of the opening 302 in the bottom wall 301 of the receptacle 300 has been found to facilitate convenient placing of the receptacle 300 (prior or subsequent to insertion of the juice extractor 334 into the receptacle) onto the open top of the bowl 32.

The illustrated shank 335 of the juice extractor 334 can be replaced with an otherwise configured shank, e.g., a shank having more than four external ribs. It has been found that the illustrated configuration of the shank 335 (with four equidistant radially outwardly extending ribs, as best shown in FIG. 3) is quite satisfactory because the shank is adequately guided in the socket 348 and can rotate relative to the receptacle 300 with a relatively small amount of friction. The lower end portion 347 of the shank 335 can have a substantially hemispherical outline.

The food processor of FIGS. 4-9 exhibits the advantage that one and the same adapter can be used to transmit torque to the juice extractor 334 as well as to any one of a number of other tools or implements. Thus, when the food processor is clean, the adapter 56 can remain on the extension 51 of the bottom portion 50 of the bowl 32 if the operator wishes to replace the cover 34 with the bowl 300 or vice versa. Also, the adapter 56 can remain in the bowl 32 if the operator wishes to replace the tool 84 with the tool 65 or vice versa. At the same time, the adapter 56 can be readily removed from the interior of the bowl 32, e.g., for the purposes of cleaning, and can accept and drive tools which are much smaller than tools in conventional food processors.

Figure 11:
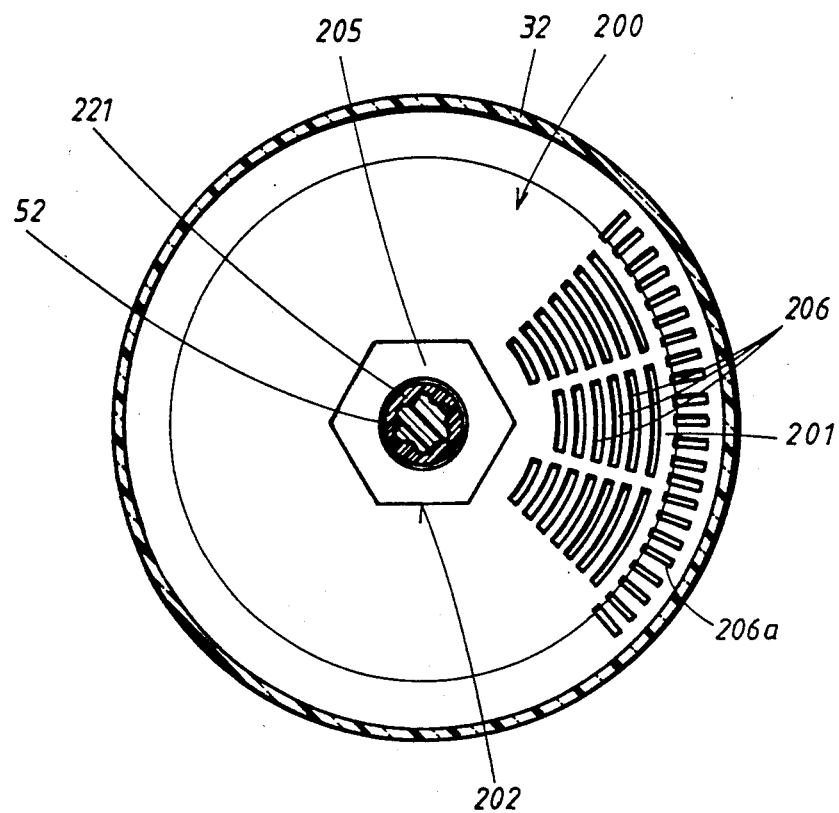
FIG. 11 is a smaller-scale horizontal sectional view as seen in the direction of arrows from the line XI—XI of FIG. 10.

FIGS. 10 and 11 illustrate a portion of a third food processor wherein the juice extractor 234 is driven by a rotary torque transmitting member 221 constituting a modification of the rotary member 321. The receptacle 200 is practically identical with the receptacle 300 of the food processor of FIGS. 1-3 and, therefore, all of its parts are denoted by reference numerals similar to those used in FIGS. 1-3 minus 100. The main difference is that the opening 202 has a polygonal outline (see FIG. 11) and is located substantially centrally of the bottom wall 201. This receptacle is removably mounted on the open top of the bowl 32 which has a tubular extension 51 surrounding the insulator 52 of the output member of the prime mover. The bowl 32 and the prime mover (as well as the housing) of the food processor of FIGS. 10-11 can be identical with the bowl 32, prime mover 36-40, 42, 52 and housing 30 of the food processor which is shown in FIGS. 1-3. The insulator 52 has an external coupling element 55 which can transmit torque to the internal coupling element 222 on the tubular lower portion 223 of the rotary torque transmitting member 221. The receptacle 200 can be replaced with the cover 34 of FIG. 4.

The opening 202 non-rotatably receives the lower portion 214 of a housing or casing 205 for a planetary transmission which serves to drive the juice extractor 234 in response to rotation of the member 221. The casing 205 has an external shoulder 217 abutting the top face 204 of the bearing member 203. The upper portion of the member 221 has a sun gear 226 which is received in and is rotatable relative to the casing 205. The sun gear 226 of the rotary member 221 meshes with a planet pinion 240 which is rotatably mounted in a planet carrier 227 in the casing 205. The planetary carrier 227 is separably connected to and rotates the juice extractor 234. The configuration of the external surface of the lower portion 214 of the casing 205 is complementary to that of the surface surrounding the opening 202 in the central portion of the bottom wall 201.

The upper portion of the receptacle 200 is a hollow cylinder and the lower portion of the receptacle is a hollow conical frustum the lowermost part of which is integral with the bottom wall 201. The frustoconical portion of the receptacle 200 is received in the bowl 32 when the receptacle replaces the cover 34.

The underside 212 of the casing 205 is somewhat spaced apart from the top of the extension 51 and the casing has a centrally located sleeve 213 surrounding the tubular portion 223 of the rotary member 221. The latter has a collar 224 which overlies the sleeve 213 and is disposed at a level immediately or closely below the sun gear 226. The sun gear 226 is provided on a cylindrical upper portion 225 of the rotary member 221. The outer diameter of the portion 225 is considerably less than that of the tubular lower portion 223. The rotary member 221 is a one-piece body of plastic material and, for the sake of simplicity and lower cost, the teeth of the sun gear 226 are or can be formed directly in the cylindrical portion 225. The planet pinion 240 has teeth 242 which mate with the teeth of the sun gear 226. This pinion is or can be made from a single piece of plastic material and its teeth 242 further mate with the teeth on an internal gear 216 which is an integral part of the casing 205. The planet carrier 227 is also made from a single piece of plastic material and includes a horizontal flange 229 which carries the shaft 228 for the planet pinion 240, a tubular intermediate portion which surrounds the tip of the rotary member 221, and a tubular uppermost portion 230 which extends into the central projection or shank 235 of the juice extractor 234. The shaft 228 is received in an axial hole 241 of the planet pinion 240. The portion 230 has a polygonal (e.g., hexagonal) outline and is surrounded by the complementary polygonal internal surface surrounding the blind hole in the projection 235 of the juice extractor 234. The shaft 228 is parallel to and is laterally offset from the polygonal portion 230.

The casing 205 is also made from a single piece of plastic material.

The thickness of the upper marginal portion of the casing 205 is less than the thickness of the lower part of this casing, and the marginal portion has upwardly extending prongs 215 which surround and engage a detachable cover or lid 219. At least one of the prongs 215 has an inwardly extending projection 218 (male detent member) received in a complementary recess (female detent member) of the cover 219.

The internal space 236 of the juice extractor 234 receives the projection 235 and is surrounded by the hills 237 and valleys 238 of the outer wall of the juice extractor. The lower end face 233 of the projection 235 rests on a complementary upwardly facing shoulder of the planet carrier 227. This ensures that the extractor 234 extends close to but is not in actual contact with the upper side of the bottom wall 201 of the receptacle 200.

The mode of operation of the food processor which embodies the structure of FIGS. 10 and 11 is analogous to that of the food processor of FIGS. 1–3 except that the torque transmitting connection between the rotary torque transmitting member 221 and the juice extractor 234 comprises a planetary transmission.

The ratio of RPM of the juice extractor 234 to the RPM of the rotary member 221 can be in the range of 1:5 or 1:6, the same as that between the rotational speeds of the member 321 and juice extractor 334 or FIGS. 1–3.

The juice extractor 234 or 334 can be replaced with other types of juice extractors. The same applies for the receptacle 200 or 300 and for the means for releasably locking the receptacle to the bowl 32. Last but not least, the illustrated planetary transmission can be replaced with other types of transmissions or with a different planetary transmission, e.g., with a transmission having two or more planet pinions.

It is further clear that the single-purpose torque transmitting member 221 of the food processor which is shown in FIGS. 10 and 11 can be replaced with an adapter. For example, the teeth 340' of the adapter 56 shown in FIGS. 6–9 can constitute (or can be replaced with) a sun gear which meshes with the pinion 240.

The food processor of FIGS. 10 and 11 can be rapidly converted for any one of a large number of different food processing operations by the simple expedient of rotating the receptacle 200 so as to disengage its locking portion 208 from the handle of the bowl 32 and to simultaneously disengage the projection 211 from the adjacent portion of the housing for the motor of the prime mover. The receptacle 200 is then ready to be lifted off the open top of the bowl 32 and the latter can receive an adapter (such as 56) for a selected tool (such as 65 or 84), and its top can be closed by a cover 34.

The lid 219 constitutes an optional but desirable and advantageous feature of the improved food processor. Its purpose is to reduce the likelihood of penetration of fragments of fruit and/or juice into the casing 205. The solid contents of fruit and/or juice could settle on the teeth in the casing 205 and could interfere with the operation of the transmission. The detent means 215, 218 can be replaced with other suitable means for releasably coupling the lid 219 to the casing 205, e.g., with a bayonet mount.

The embodiments of FIGS. 1–3 and 4–9 exhibit the advantage that the number of parts in the means for transmitting motion from the output member 42, 52 to the juice extractor 334 is smaller than in the food processor of FIGS. 10 and 11. On the other hand, the food processor of FIGS. 10–11 exhibits the advantage that the juice extractor 234 is less likely to wobble and/or to jam in the receptacle 200 because its axis of rotation coincides with the axis of rotation of the rotary member 221 (or of an adapter if the member 221 is replaced with an adapter).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A food processor comprising a housing; a prime mover installed in said housing and having an upright rotary output member; a bowl removably mounted on said housing and having an open top and a bottom portion with an opening for said output member; a receptacle removably mounted on and having an apertured bottom wall overlying the open top of said bowl; a rotary juice extractor in said receptacle; and means for transmitting torque from said output member to said juice extractor, said extractor being rotatable by said torque transmitting means about a first axis, and said output member defining a discrete second axis other than said first axis, said torque transmitting means including a torque transmitting member which is interposed between said output member and said extractor, and said torque transmitting member being rotatable about said second axis by said output member and being arranged to directly engage said extractor.

2. The food processor of claim 1, wherein said torque transmitting member has a first set of teeth arranged to orbit about said second axis, said juice extractor having a second set of teeth mating with the teeth of said first set and arranged to orbit about said first axis.

3. The food processor of claim 2, wherein said juice extractor has an internal gear including said second set of teeth.

4. The food processor of claim 1, wherein said torque transmitting member comprises a one-piece rotary member containing a plastic material, said output member including an insulator having a first coupling element and said one-piece member having a second coupling element mating with said first coupling element.

5. The food processor of claim 4, wherein said one-piece member includes a tubular first portion which surrounds said insulator and a second portion which extends through said bottom wall and transmits torque to said juice extractor.

6. The food processor of claim 1, wherein said torque transmitting member has a first set of teeth arranged to orbit about said second axis, said juice extractor having a second set of teeth arranged to orbit about said first axis and mating with the teeth of said first set, said torque transmitting member further including a portion adjacent said first set of teeth and said juice extractor having an annular space for said portion of said torque transmitting member.

7. The food processor of claim 6, wherein said juice extractor has an outer wall surrounding said annular space and an inner wall concentric with said outer wall and surrounded by said annular space.

8. The food processor of claim 1, wherein said bottom wall has a socket spaced apart from said torque transmitting member and said juice extractor has a centrally located projection rotatable in said socket.

9. The food processor of claim 8, wherein said projection is rotatable about said first axis, and said second axis being parallel to said first axis.

10. The food processor of claim 8, wherein said socket has a deepmost portion bounded by a substantially flat surface and said projection abuts said surface.

11. The food processor of claim 1, wherein said juice extractor includes a substantially conical body having a base provided with an internal gear rotatable about said first axis and engaging said torque transmitting member.

12. The food processor of claim 1, wherein said bowl has a centrally located first tubular portion extending upwardly from said bottom portion and surrounding said output member, said torque transmitting member including a second tubular portion and one of said tubular portions surrounding the other of said tubular portions.

13. The food processor of claim 1, wherein said juice extractor is disposed substantially centrally of said receptacle and said first axis is spaced apart from and is substantially parallel to the axis of said output member.

14. The food processor of claim 1, further comprising means for releasably securing said receptacle to said bowl.

15. The food processor of claim 1, further comprising means for blocking the operation of said prime mover in response to detachment of said receptacle from said bowl.

16. The food processor of claim 1, wherein said bottom wall includes a bearing for said juice extractor, said bearing defining said first axis.

17. The food processor of claim 1, wherein said torque transmitting member is designed to rotate said juice extractor at a speed which deviates from the speed of said output member.

18. The food processor of claim 1, further comprising means for separably coupling said torque transmitting member to said juice extractor and to said output member.

19. The food processor of claim 1, wherein said juice extractor has a wall which is remote from said first axis, said torque transmitting member being arranged to engage said wall of said juice extractor.

20. A food processor comprising a housing; a prime mover installed in said housing and having an upright rotary output member; a bowl removably mounted on said housing and having an open top and a bottom portion with an opening for said output member; a receptacle removably mounted on and having an apertured bottom wall overlying the open top of said bowl; a rotary juice extractor in said receptacle; and means for transmitting torque from said output member to said juice extractor, said extractor being rotatable by said torque transmitting means about a first axis and said torque transmitting means being rotatable about a discrete second axis other than said first axis, said torque transmitting means comprising a rotary adapter separably mounted on and driven by said output member and arranged to rotate said juice extractor, and said adapter having a first coupling element receiving torque from said output member, a second coupling element arranged to transmit torque to said juice extractor, and a third coupling element disposed in said bowl and arranged to drive a rotary tool.

21. The food processor of claim 20, wherein said third coupling element is adjacent said bottom portion.

22. The food processor of claim 20, wherein said third coupling element is adjacent the open top of said bowl.

23. The food processor of claim 20, wherein at least one of said coupling elements has teeth which are inclined with reference to the axis of said adapter.

24. The food processor of claim 20, wherein said adapter consists of a single piece of plastic material and includes a hollow portion surrounding said output member in said bowl and a second portion coaxial with said hollow portion, said second coupling element being provided on the second portion of said adapter.

* * * * *